United States Patent
Nagy et al.

(10) Patent No.: US 7,671,151 B2
(45) Date of Patent: *Mar. 2, 2010

(54) OLEFIN POLYMERIZATION PROCESS

(75) Inventors: Sandor Nagy, Naperville, IL (US); Barbara M. Tsuie, Cincinnati, OH (US); Stephen M. Imfeld, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/154,268

(22) Filed: May 21, 2008

(65) Prior Publication Data

US 2009/0292087 A1 Nov. 26, 2009

(51) Int. Cl.
C08F 4/76 (2006.01)
C08F 4/64 (2006.01)
C08F 4/52 (2006.01)

(52) U.S. Cl. ........................ 526/172; 526/161; 526/170; 526/160; 526/134; 526/348; 526/901

(58) Field of Classification Search ................. 526/172, 526/161, 160, 170
See application file for complete search history.

(56) References Cited

U.S. PATENT DOCUMENTS

| 5,153,157 | A | 10/1992 | Hlatky et al. |
| 5,198,401 | A | 3/1993 | Turner et al. |
| 5,241,025 | A | 8/1993 | Hlatky et al. |
| 5,414,180 | A | 5/1995 | Geerts et al. |
| 5,648,440 | A | 7/1997 | Sugano et al. |
| 5,962,598 | A | 10/1999 | Mack et al. |
| 6,211,311 | B1 | 4/2001 | Wang et al. |
| 6,232,260 | B1 | 5/2001 | Nagy et al. |
| 6,451,724 | B1 | 9/2002 | Nifant'ev et al. |
| 6,559,251 | B1 | 5/2003 | Wang et al. |
| 6,770,715 | B2 | 8/2004 | Garrison et al. |
| 6,903,162 | B2 | 6/2005 | Nygard et al. |
| 6,908,972 | B2 | 6/2005 | Tsuie et al. |
| 7,196,147 | B2 | 3/2007 | Wang et al. |
| 2009/0062490 | A1 * | 3/2009 | Nagy et al. .................. 526/126 |

OTHER PUBLICATIONS

Stadler, et al., *Macromolecules 39*, (2006), 1474-1482.
Yau, et al., "New Approaches Using MW-Sensitive Detectors in GPC-TREF for Polyolefin Characterization", *Polymer 42* (2001) 8947.
Wild, et al., "Development of High Performance TREF For Polyolefin Analysis", *New Advances in Polyolefins*, 67 (1993) 147.
Wild, "Temperature Rising Elution Fractionation", *Advances in Polymer Science 98* (1991) 1.

* cited by examiner

*Primary Examiner*—Ling-Siu Choi
*Assistant Examiner*—Rip A. Lee
(74) *Attorney, Agent, or Firm*—John Tyrell; Jonathan L. Schuchardt

(57) ABSTRACT

A process for making polyethylene having an uncommon but valuable balance of broad molecular weight distribution and a low level of long-chain branching is disclosed. The process comprises polymerizing ethylene in a single reactor in the presence of an α-olefin and a catalyst comprising an activator and a supported dialkylsilyl-bridged bis(indeno[1,2-b]indolyl)zirconium complex. The polyethylene, which has an $M_w/M_n$ greater than 10 and a viscosity enhancement factor (VEF) of less than 2.5, is valuable for making blown films.

10 Claims, No Drawings

OLEFIN POLYMERIZATION PROCESS

FIELD OF THE INVENTION

This invention relates to a process for making ethylene copolymers in a single reactor. The process provides polyethylene with a broad molecular weight distribution and a low level of long-chain branching.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. The large variety of active sites in Ziegler-Natta catalysts makes it difficult to control polymer architecture. To improve polymer properties, single-site catalysts, in particular metallocenes, are beginning to replace Ziegler-Natta catalysts.

U.S. Pat. Nos. 6,232,260 and 6,451,724 disclose the use of transition metal catalysts based upon indenoindolyl ligands. Indenoindolyl catalysts are remarkably versatile because substituent effects and bridging changes can often be exploited to provide polymers with tailored physical or mechanical properties. Unbridged indenoindolyl complexes (as exemplified in the '260 patent) usually provide favorable activity although they sometimes fail to provide polymers having high enough molecular weights. Bridged indenoindolyl complexes (as taught, e.g., in U.S. Pat. No. 6,908,972) readily copolymerize α-olefins and provide polymers with varying levels of long-chain branching. Some of the examples have very low long-chain branching (e.g., Example 15 reports no long-chain branching and $M_w$=90,700). For a discussion of long-chain branching in polyethylene, see *Macromolecules* 39 (2006) 1474 and references cited therein.

Copending application Ser. No. 11/899,090, filed 4 Sep. 2007, discloses a slurry process to make an ethylene copolymer having, among other attributes, low long chain branching. Indenoindolyl complexes, including dialkylsilyl-bridged bis(indeno[1,2-b]indolyl)zirconium complexes, are used. Hydrogen is not required, and the effect of including hydrogen on polymer molecular weight distribution is not discussed. In the examples of the '090 application, the polymers have narrow molecular weight distributions.

Copending application Ser. No. 11/899,113, filed 4 Sep. 2007, discloses a high-activity slurry process to make an ethylene copolymer with broad molecular weight distribution with certain indenoindolyl complexes, including dialkylsilyl-bridged bis(indeno[1,2-b]indolyl)zirconium complexes. Several of the polymers made have $M_w/M_n$ values greater than 10, but the reference is generally silent regarding the long-chain branching content of the polymers.

Despite the industry's considerable experience with single-site catalysts generally and indenoindolyl catalysts in particular, there is a need for improvement. Often, to get broad molecular weight distribution, polymer blends are prepared, or processes utilizing two or more reactors are used. Catalysts that provide good incorporation of α-olefins also frequently produce polyethylene with too much long-chain branching, which adversely impacts polymer properties. Many processes that provide good incorporation of α-olefins do not incorporate the comonomer uniformly. The comonomer is either distributed unevenly in the polyethylene chain or is predominantly in the low-molecular-weight fraction.

Usually, a compromise must be made among properties. A valuable process would employ a single reactor and would provide polyethylene with both broad molecular weight distribution and low long-chain branching. Ideally, the polyethylene would demonstrate good processing and physical properties in the production of blown films.

SUMMARY OF THE INVENTION

The invention is a process for making polyethylene having a broad molecular weight distribution and a low level of long-chain branching. The process comprises polymerizing ethylene in a single reactor in the presence of a $C_3$-$C_{10}$ α-olefin, hydrogen, and a supported dialkylsilyl-bridged bis(indeno[1,2-b]indolyl)zirconium complex. The polyethylene, which has an $M_w/M_n$ greater than 10 and a viscosity enhancement factor (VEF) of less than 2.5, is valuable for making blown films. The combination of attributes—broad molecular weight distribution in a single reactor process and low long-chain branching—strikes an uncommon but valuable balance, and it requires judicious selection of the complex and the process conditions.

DETAILED DESCRIPTION OF THE INVENTION

The invention is a process for polymerizing ethylene in the presence of hydrogen and a $C_3$-$C_{10}$ α-olefin. Suitable $C_3$-$C_{10}$ α-olefins include, for example, propylene, 1-butene, 1-hexene, 1-octene, and mixtures thereof. Preferred $C_3$-$C_{10}$ α-olefins are 1-butene, 1-hexene, and 1-octene. The polymerization is performed in a single reactor, preferably at a temperature within the range of 40° C. to 90° C., more preferably from 50° C. to 85° C. Preferably, the process is a continuous process. Suitable processes include slurry, gas-phase, and solution. Preferably, the reactor is a slurry reactor or a gas-phase reactor.

The polymerization is performed in the presence of a catalyst comprising an activator and a supported complex. Complexes useful for process of the invention are dimethylsilyl-bridged bis(indeno[1,2-b]indolyl)zirconium complexes. Preferred complexes have the structure:

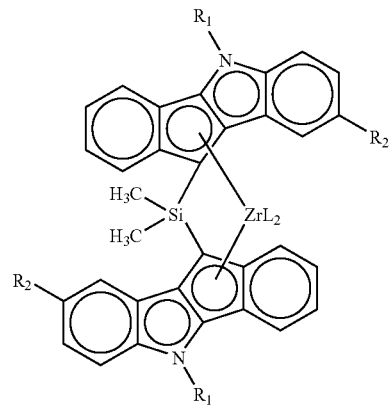

in which each $R_1$ is independently $C_1$-$C_{10}$ hydrocarbyl; each $R_2$ is independently selected from the group consisting of H, F, and $C_1$-$C_{10}$ hydrocarbyl; and each L is independently selected from the group consisting of halide, alkoxy, aryloxy, siloxy, alkylamino, and $C_1$-$C_{30}$ hydrocarbyl. Preferably, $R_1$ is methyl and each L is Cl. A particularly preferred complex has the structure:

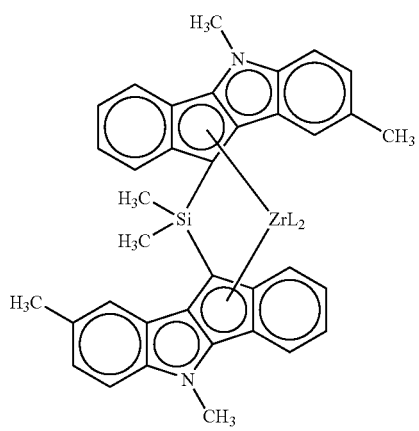

wherein each L is independently selected from the group consisting of halide, alkoxy, aryloxy, siloxy, alkylamino, and $C_1$-$C_{30}$ hydrocarbyl.

As those skilled in the art will appreciate, the complexes shown above might be prepared as a single stereoisomer or as a mixture of stereoisomers. Throughout this patent application, a given structure is meant to encompass all possible stereoisomers of that complex, alone or in combination, and no structure is intended to be limited to any one particular stereoisomer. In one aspect, the inventive process uses a complex that is a mixture of diastereomers.

Diastereomers are stereoisomers that are not mirror images of each other and generally differ in chemical and physical properties. In contrast, enantiomers are stereoisomers that are mirror images of each other and share most chemical and physical properties. With many dialkylsilyl-bridged bis(indeno[1,2-b]indolyl)zirconium complexes, we can have three possible stereoisomers, including a pair of enantiomers (often a racemic mixture or "rac" having equal amounts of enantiomers) and a "meso" form. The meso isomer possesses a plane of symmetry, so only a single stereoisomer is possible. In relation to either enantiomer of a racemic mixture, the meso isomer is a diastereomer.

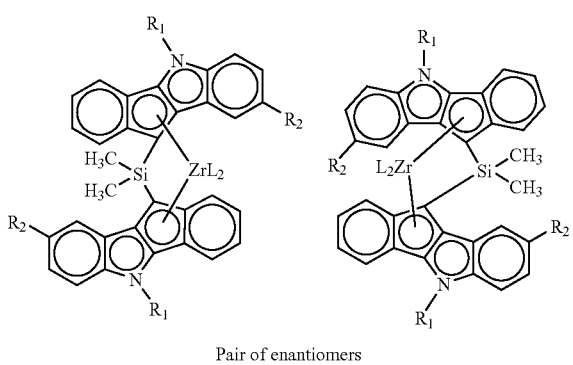

Pair of enantiomers

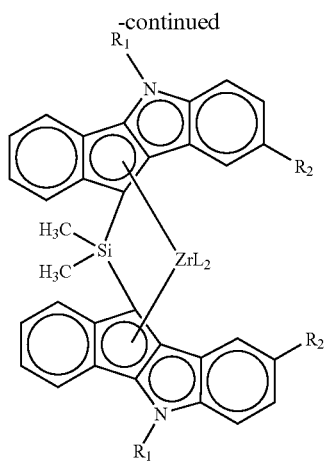

Meso form

When a mixture of diastereomers is used, it may comprise racemic and meso stereoisomers. Preferably, the molar ratio of rac:meso stereoisomers is within the range of 0.1:1 to 1:0.1, more preferably from 0.5:1 to 1:0.5.

Indeno[1,2-b]indolyl ligands are conveniently generated by deprotonating an indeno[1,2-b]indole compound using a potent base. Suitable indeno[1,2-b]indolyl ligands and ways to name, synthesize, and incorporate them into a dimethylsilyl-bridged zirconium complex have been described in considerable detail elsewhere; see, for example, U.S. Pat. Nos. 6,232,260, 6,908,972 and 6,559,251, the teachings of which are incorporated herein by reference, and the references cited therein.

Example 1 of U.S. Pat. No. 6,908,972 illustrates a particularly useful way to prepare complexes suitable for use in the inventive process. Usually, the indeno[1,2-b]indole precursor having the desired substituents is prepared by reacting the appropriate 1-indanone and arylhydrazine precursors. The indole nitrogen can then be alkylated. Deprotonation followed by reaction with dichlorodimethylsilane conveniently attaches silicon at the indenyl methylene. Reaction of the monochlorosilane with an indenoindolyl anion provides the desired bridged ligand precursor. Double deprotonation and combination of the resulting dianion with a zirconium source affords the ultimate target, a dimethylsilyl-bridged bis(indeno[1,2-b]indolyl)zirconium complex. This generally provides a mixture of diastereomers. By taking advantage of the different solubility and crystallization behaviors of the rac and meso stereoisomers, the rac:meso ratio can be altered. Similarly, changes in reaction conditions such as temperature, solvent, or the addition of certain amines such as pyridine can alter the rac:meso ratio. When a mixture of diastereomers is synthesized, the ratio can be altered by selectively washing out either the rac or the meso stereoisomers or by selective crystallization. Mixtures rich in rac or rich in meso can be blended to give a desired rac:meso ratio.

An activator is used in the polymerization. The activator helps to ionize the zirconium complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethylaluminum chloride, trimethylaluminum, triisobutyl-aluminum), and the like. Suitable activators include salts that contain non-nucleophilic anions. These compounds generally consist of bulky ligands attached to boron or aluminum. Examples include lithium tetrakis(pentafluoro-phenyl)borate, lithium tetrakis(pentafluorophenyl)aluminate, anilinium tetrakis-(pentafluorophenyl)borate, trityl tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of zirconium complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of zirconium. When the activator is an organoborane or an ionic borate or aluminate, the amount used will be within the range of about 0.01 to about 5000 moles, preferably from about 0.1 to about 10 moles, of activator per mole of zirconium.

The catalyst comprises a supported zirconium complex. The support is preferably a porous material such as inorganic oxides and chlorides, and organic polymer resins. Preferred inorganic oxides include oxides of Group 2, 3, 4, 5, 13, or 14 elements. Preferred supports include silicas, aluminas, silica-aluminas, magnesias, titanias, zirconias, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. The amount of complex added is preferably from 0.01 to 0.5 mmol per gram of support.

In one suitable catalyst preparation method, a solution of the complex is combined with the support. The mixture is stirred in an inert atmosphere at a temperature within the range of 0° C. to 120° C., more preferably from 20° C. to 40° C. The optimum stirring time will vary somewhat, depending upon the amounts of solvent and support, but it should be long enough to ensure good mixing. Preferably, the stirring time is from 2 to 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free-flowing solid. This can be done at room temperature by applying a vacuum. Alternatively, an incipient wetness technique can be used in which a small amount of solvent is used to dissolve the complex and the solution is added to the support material. The mixture remains a free-flowing solid without solvent removal. The mixture can be used as is or residual solvent may be removed.

Different methods for addition of the activator and for combining the complex with the support may be used. In one suitable method, the activator is premixed with the support and the complex is added to the mixture of support and activator. Optionally, the activator is combined with the complex and the mixture of activator and complex is added to the support. Alternatively, a portion of the activator is combined with the support and a mixture of the complex and the remaining amount of the activator is added to the support.

Preferably, the process produces polyethylene with uniform incorporation of the $\alpha$-olefin. Comonomer incorporation is determined using a temperature rising elution fractionation (TREF) technique (For a description of TREF, see *Polymer* 42 (2001) 8947; *New Advances in Polyolefins* 67 (1993) 147; and *Adv. Polym. Sci.* 98 (1991) 1.) The procedure utilizes a crystallization and redissolution process to separate polymers having different comonomer contents. More specifically, the polyethylene is dissolved in a suitable solvent and injected onto a packed column which is slowly cooled. During the cooling, polyethylene fractions having different levels of comonomer incorporation precipitate and coat the packing particles in layers with the most highly branched fraction precipitating out last to form the outermost layer in the column. The column is then subjected to a controlled heating and elution step where, as the temperature increases with time, the more highly branched molecules elute first followed by molecules having decreasing levels of comonomer. By utilizing suitable detection means, typically an infrared detector, the polymer concentration over the elution temperature range can be plotted to provide a comonomer distribution curve, i.e., TREF curve. If the comonomer incorporation is non-uniform, the TREF curve has a multimodal peak or has pronounced "fronting." Pronounced fronting is caused by the portion of the polyethylene that has greater comonomer incorporation causing that portion to elute at lower temperatures. More uniform incorporation is substantially unimodal with little or no fronting. By "uniform comonomer incorporation," we mean that TREF analysis shows a substantially unimodal peak with little or no fronting.

Another indication of uniformity of comonomer incorporation is melting point. For the same number of branches (same amount of incorporated comonomer), the melting point is lower as the amount of comonomer is increased and as the distribution becomes more uniform. For example, when 1-butene is used as the comonomer, at about 5 ethyl branches per 1000 carbons, the melting point is greater than 127° C. for non-uniform 1-butene incorporation while it is below 127° C. for uniform incorporation. With more 1-butene, the effect is more pronounced. At 10 ethyl branches per 1000 carbons, the melting point is greater than 125° C. for non-uniform 1-butene incorporation while it is below 122° C. for uniform incorporation.

The process produces polyethylene with little or no long-chain branching. As described in *Macromolecules* 39 (2006) 1474, rheological measurements can be used to estimate the amount of long-chain branching. At low shear rates, the viscosity of polyethylene with long-chain branching is higher than the viscosity of linear polyethylene of equivalent molecular weight. We can use a viscosity enhancement factor (VEF) as an indication of long-chain branching. The viscosity enhancement factor can be determined from the ratio of the measured viscosity at a fixed temperature and frequency to the viscosity predicted for linear polyethylene of equivalent molecular weight. Preferably, the temperature used is 190° C.

and the frequency is 0.025 rad/s. For the purpose of this application, by "viscosity enhancement factor" we mean the ratio of the measured viscosity at 190° C. and a frequency of 0.025 rad/s to the viscosity predicted for linear polyethylene of equivalent molecular weight. The viscosities of more than forty linear polyethylene samples of varying weight-average molecular weight were measured to develop the relationship between $M_w$ and viscosity at 0.025 rad/s. The viscosity prediction for linear polyethylene=$(2.1\times10^{-14})$ $(M_w^{3.66})$. A linear polyethylene will have a viscosity enhancement factor of about 1, while a sample of polyethylene known to have substantial long-chain branching had a viscosity enhancement factor of 15. By "low long-chain branching," we mean a viscosity enhancement factor of less than 2.5. Such polyethylenes are mostly linear, and the rheological effect of any long-chain branching is insubstantial. For more details about how to measure and compute VEF, see copending application Ser. No. 11/897,438, filed Aug. 29, 2007, the teachings of which are incorporated herein by reference.

The inventive process provides polyethylene with broad molecular weight distribution as indicated by a $M_w/M_n$ greater than 10, preferably greater than 14. Diastereomers in a complex can have different hydrogen sensitivities; thus a broad polymer molecular weight distribution might be due, at least in part, to the selection of a particular mixture of diastereomers. The amount of hydrogen used will depend upon the desired molecular weight and the desired molecular weight distribution. Generally, for the inventive process, molecular weight decreases and molecular weight distribution broadens with increasing levels of hydrogen. Preferably, the molecular weight distribution is unimodal.

Preferably, the inventive process has good hydrogen sensitivity and even low levels of hydrogen reduce the polymer molecular weight. Increased levels of hydrogen further reduce the molecular weight. The hydrogen sensitivity can be judged by comparing polymerizations with and without added hydrogen. By "good hydrogen sensitivity," we mean that introduction of 0.82 mmoles of hydrogen per 1 mole of ethylene into the liquid phase of the polymerization reaction mixture reduces the weight-average molecular weight of the polymer by at least 60%.

Preferably, the process uses a highly active catalyst. A convenient measure of activity is the amount of polyethylene formed per hour per gram of zirconium used. Because factors such as temperature or time can influence the measured activity, it is convenient to compare measured activities with those obtained by using a known complex under similar polymerization conditions. One such readily available complex is bis(cyclopentadienyl)zirconium dichloride.

As defined herein, "activity ratio" means the value of $A_1/A_2$, where $A_1$ is the activity (grams of polymer per gram of Zr per hour) of a complex of interest that is supported and activated as described in Example 1 and is then used for a slurry polymerization in the presence of 1-butene and hydrogen as described in Example 3; and $A_2$ is the activity of bis(cyclopentadienyl)zirconium dichloride that is supported and activated as described in Example 3 and is then used for a slurry polymerization as described in Example 3 except that 1-butene and hydrogen are omitted from the slurry polymerization.

Thus, the baseline experiment with $Cp_2ZrCl_2$ is an ethylene homopolymerization performed in the absence of hydrogen. Catalysts useful in the process of the invention have an activity ratio as defined herein greater than 4, preferably greater than 5.

Complex concentrations used for the olefin polymerization depend on many factors. Preferably, however, the concentration ranges from about 0.01 micromoles zirconium per liter to about 100 micromoles per liter. Olefin partial pressures normally range from about 0.1 MPa to about 350 MPa. More preferred is the range from about 0.1 MPa to about 7 MPa. Polymerization times depend on the type of process, the complex concentration, and other factors. Generally, polymerizations are complete within several seconds to several hours.

The invention includes polyethylene compositions. The compositions have an $M_w/M_n$ greater than 10, unimodal molecular weight distribution, uniform comonomer incorporation, and low long-chain branching as indicated by a viscosity enhancement factor of less than 2.5. Prior compositions having such high $M_w/M_n$ values have bimodal or multimodal molecular weight distributions, higher levels of long-chain branching, or both.

The polyethylene compositions are useful for making blown films according to methods that are well known in the art. See, e.g., U.S. Pat. Nos. 5,962,598; 6,770,715; and 6,903,162, the teachings of which related to film making are incorporated herein by reference. Example 24 below illustrates a way to make blown films from polyethylene resins of the invention. The films process well, as indicated by the ability to achieve favorable outputs and good bubble stability at low extruder pressure. Additionally, the film properties, particularly machine-direction (MD) and transverse-direction (TD) tear strengths and impact strength (as measured by TEDD) are well balanced. The ability to make such films from a polyethylene resin produced in a single reactor is particularly valuable.

The following examples merely illustrate the invention. Those skilled in the art will recognize many variations that are within the spirit of the invention and scope of the claims.

EXAMPLE 1

A 1-L flask equipped with a stir bar is charged with 5,8-dimethyl-5,10-dihydroindeno[1,2-b]indole (26.5 g, 114 mmol) and diethyl ether (240 mL). The flask is equipped with a straight-tip gas inlet adapter with rubber septum and a reflux condenser. The mixture is cooled to 0° C., and n-butyllithium (75.0 mL, 1.6 M in hexanes, 120 mmol) is added by cannula. The mixture initially turns bright yellow, then clear orange when base addition is complete. After 20 minutes, a thick yellow paste forms. The mixture is warmed to room temperature and maintained under nitrogen overnight. A solution of dichlorodimethylsilane (7.0 mL, 58 mmol) in diethyl ether (120 mL) is added at room temperature. The mixture warms, and the slurry darkens. Once addition is complete, the mixture is brought to reflux for 3 hours and is then cooled to room temperature. Water (250 mL) is added, a solid separates from the organic layer, and the mixture is filtered. The solid is washed with diethyl ether (300 mL) and dried under vacuum to afford a gray solid (27.8 g, 46.9%).

A portion of the gray solid (3.56 g, 6.80 mmol) is slurried in 100 mL of diethyl ether and n-butyllithium (6.0 mL, 2.5 M in hexanes, 15.0 mmol) is added by syringe to the slurry. The mixture is maintained at room temperature overnight and the color changes from yellow to orange. Methylene chloride (30 mL) is added to zirconium tetrachloride (1.58 g, 6.79 mmol) followed by diethyl ether (50 mL) to give a slightly turbid mixture. The dianion is added, the mixture turns deep magenta, and a precipitate forms. The mixture is stirred for 48 hours. The mixture is filtered and the dark purple residue is extracted with methylene chloride (approximately 50 mL) and filtered. The filtrate is concentrated to approximately 70 mL and maintained to form a precipitate, which is filtered and dried. The $^1$H NMR spectra reveals that washed residue and the precipitate are each the complex, 1,1-dimethylsilyl-bis(5,10-dihydrido-5,8-dimethyl-indeno[1,2-b]indolyl)zirconium dichloride 1. The washed residue has a molar ratio of rac:meso stereoisomers of 1:1.5. The precipitate has a rac:meso ratio of 1:1 and is used in the following polymerization.

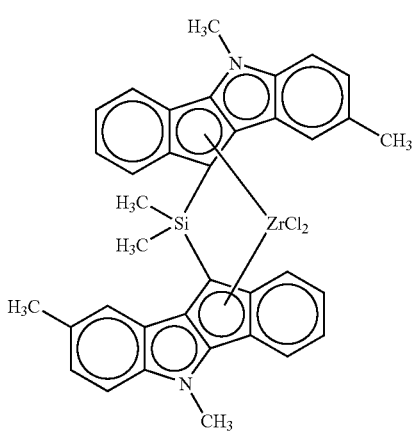

Support and Activation of Complex 1: Methylalumoxane (2.2 mL of 4.21 M solution in toluene, product of Albemarle) is added at room temperature to a slurry of 0.75 g of silica (G3, available from Fuji Silysia Chemical Ltd., calcined at 250° C. for 12 hours) in 4 mL of anhydrous toluene. The resulting stirred slurry is heated at 80° C. for two hours and cooled to ambient temperature. A 0.0926 mmole sample of dry complex, 1 (rac:meso=1:1) (Al/Zr=100) is added to the slurry and stirred for 2 hours at ambient temperature. An aliquot of this catalyst slurry is used while fresh (1 to 3 days) in polymerization tests.

Slurry Polymerization with Supported Complex 1: Isobutane (1 L), 1-butene (5 mL) and 1M triisobutylaluminum solution in hexanes (1 mL) are added to a dry, nitrogen-purged stainless-steel stirred and jacketed autoclave reactor. The reactor is heated to 70° C. and pressurized to 1.7 MPa with ethylene. Hydrogen is added from a 7-mL vessel at 4.1 MPa to effect a pressure drop of 0.7 MPa (calculated to be 0.82 mmol hydrogen per mole of ethylene). The polymerization reaction is started by injecting an aliquot of catalyst sample. The temperature is maintained at 70° C. throughout the test. Ethylene is supplied on demand to maintain the reactor pressure of 1.7 MPa. The polymerization is terminated by venting the autoclave after consumption of about 30 g of ethylene. The polyethylene sample is dried and tested.

The viscosity enhancement factor (VEF) is determined to be 1.3. By GPC, the polyethylene has a weight-average molecular weight ($M_w$) of 170,000, unimodal molecular weight distribution, and a $M_w/M_n$ of 19.2. Branching is determined by FT-IR spectroscopy to be 5.3 tertiary carbons per 1000 carbons. The melting point is determined by differential scanning calorimetry to be 125.2° C. The melt index (MI) is measured according to ASTM D-1238, Condition E to be 0.3 dg/min. Polymer density is determined by ASTM D-1505 to be 0.947 g/mL. TREF analysis shows a substantially unimodal peak with little or no fronting, indicating uniform comonomer incorporation.

EXAMPLE 2

Slurry Polymerization with Supported Complex 1 from Example 1

The slurry polymerization procedure of Example 1 is repeated to produce 20 g of polyethylene (complex 1, rac:meso=1:1).

By GPC, the polyethylene has $M_w$=149,000; $M_w/M_n$=14.9. VEF=2.1. Mp: 125.5° C. Branching: 5.5 tertiary carbons/1000 carbons. The activity ratio, computed as discussed hereinabove, is 9.5. When the slurry polymerization is repeated without hydrogen and the molecular weights are compared, hydrogen reduced the $M_w$ by 86%.

Examples 1 and 2 show that the broad molecular weight distribution is reproducible. In each example, the melting point is below 127° C., indicating uniform 1-butene incorporation.

COMPARATIVE EXAMPLE 3 n-Butyllithium (12.3 mL, 2.5 M in hexanes, 30.8 mmol) is added to a slurry of 2,5-dimethylindeno[2,1-b]indole (6.54 g, 28.0 mmol) in diethyl ether (100 mL). The solids dissolve, the solution darkens and the mixture is maintained at room temperature overnight. A solution of dichlorodimethylsilane (1.7 mL, 14.0 mmol) in diethyl ether (8 mL) is slowly added at 23° C. A precipitate forms. The mixture is allowed to stand overnight and is filtered through Celite. Volatiles are removed from the filtrate under vacuum. The residue is slurried in hexanes (50 mL) and filtered to give a solid (4.54 g, 31.0%).

The solid (4.54 g, 8.69 mmol) is dissolved in diethyl ether (100 mL), and n-butyllithium (7.7 mL, 2.5 M in hexanes, 19.3 mmol) is added at 23° C. to afford a clear red solution. The solution is maintained overnight and added to a solution of zirconium tetrachloride (2.02 g, 8.67 mmol) in methylene chloride (150 mL) and diethyl ether (50 mL). A dark orange solid forms. The mixture is filtered the next day, and the solid extracted with methylene chloride (100 mL) and washed with additional methylene chloride (20 mL). The filtrate is concentrated to about 80 mL, and a solid precipitates. A total yield of 0.15 g of complex 3 is isolated.

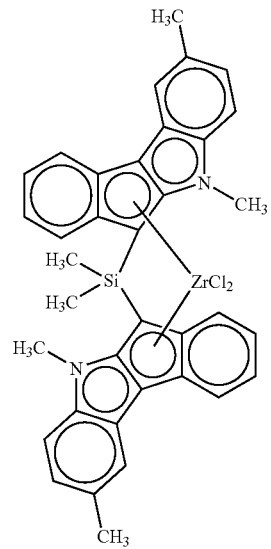

The procedures of Example 1 for supporting and activating the complex and for performing a slurry polymerization of ethylene using the supported complex are repeated using complex 3.

The resulting polyethylene has $M_w$=116,000 and $M_w/M_n$=15.4. The (VEF) is 3.4. Branching is 8.4 tertiary carbons per 1000 carbons. The activity ratio is 8.0. When the slurry polymerization is repeated without hydrogen and the molecular weights are compared, hydrogen reduced the $M_w$ by 64%.

Comparative Example 3 shows that a complex very similar to complex 1 gives higher long-chain branching, as indicated by a VEF greater than 2.5.

COMPARATIVE EXAMPLE 4

A 1-L flask equipped with a stir bar is charged with 8-methyl-5-phenyl-5,10-dihydroindeno[1,2-b]indole (20.8 g, 70.4 mmol) and diethyl ether (200 mL). The flask is equipped with a straight-tip gas inlet adapter, rubber septum, and reflux condenser. A solution of n-butyllithium (32.0 mL, 2.5 M in hexanes, 80 mmol) is added. Neat dichlorodimethylsilane (4.3 mL, 35.5 mmol) is added and a precipitate forms. The mixture is stirred for three days, filtered, and volatiles are removed from the filtrate to obtain an oily residue (8.87 g).

The oily residue (8.87 g, 13.7 mmol) is slurried in 180 mL of diethyl ether and n-butyllithium (12.0 mL, 2.5 M in hexanes, 30.0 mmol) is added by syringe to the slurry. The mixture is maintained at room temperature overnight and is added to a slurry of zirconium tetrachloride (3.16 g, 13.2 mmol) in methylene chloride (100 mL) and diethyl ether (50 mL) to give a dark red slurry. The mixture is stirred for 3 days. The mixture is filtered and dried to obtain a purple solid, 1,1-dimethylsilyl-bis(5,10-dihydrido-8-methyl-5-phenyl-indeno[1,2-b]indolyl) zirconium dichloride 4 (1.61 g).

The procedures of Example 1 for supporting and activating the complex and for performing a slurry polymerization of ethylene using the supported complex are repeated using complex 4.

The resulting polyethylene has $M_w=223,000$ and $M_w/M_n=18.1$. The VEF=3.7. Branching is 4.3 tertiary carbons per 1000 carbons. The activity ratio is 5.4. When the slurry polymerization is repeated without hydrogen and the molecular weights are compared, hydrogen reduced the $M_w$ by 68%.

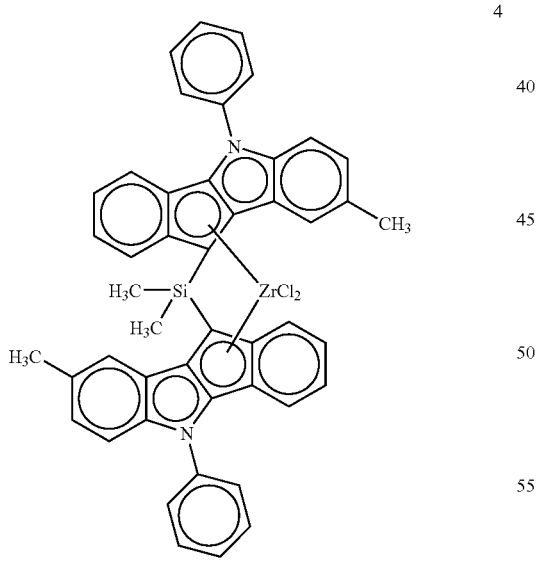

Comparative Example 4 shows that a complex very similar to complex 1 gives higher long-chain branching, as indicated by a VEF greater than 2.5.

COMPARATIVE EXAMPLES 5-23

Complexes 5-12 and 14-23 are prepared in similar fashion as complexes 1, 3, and 4 except that $CH_2$-bridged complex 9 is prepared as in U.S. Pat. No. 7,196,147 (see column 6). Complex 13 is commercially available from Sigma-Aldrich, Inc. Each complex is supported and used in a slurry polymerization in similar fashion as in Example 3. The results are reported in Table 1.

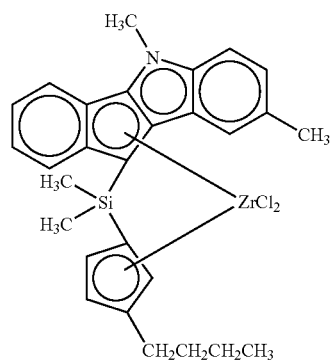

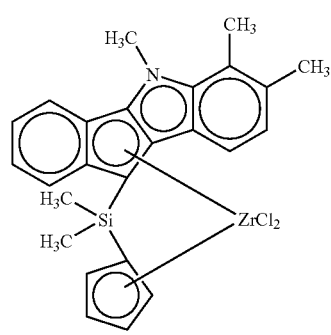

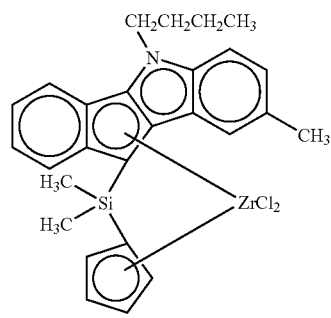

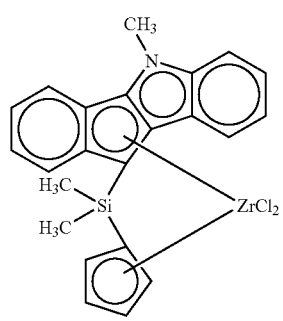

-continued
9
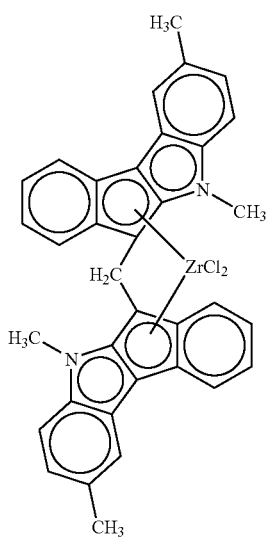
10
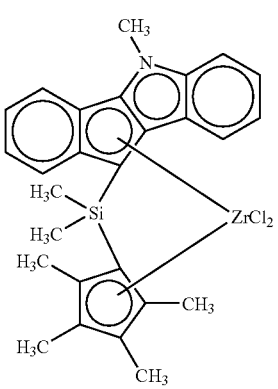
11
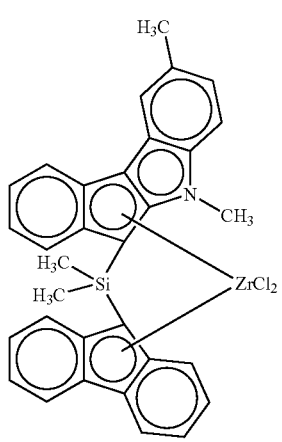
-continued
12
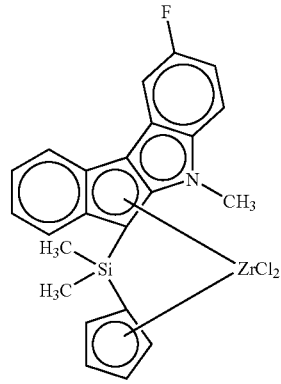
13
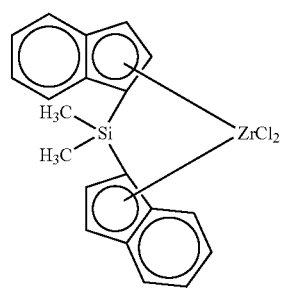
14
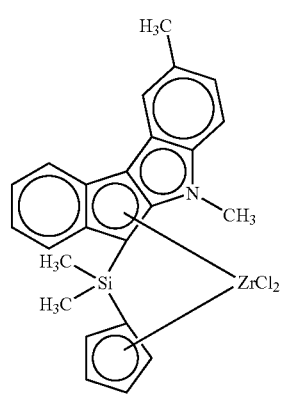
15
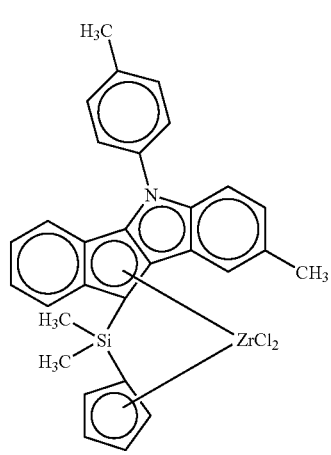

-continued
16
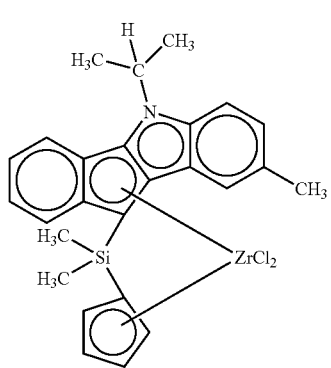
17
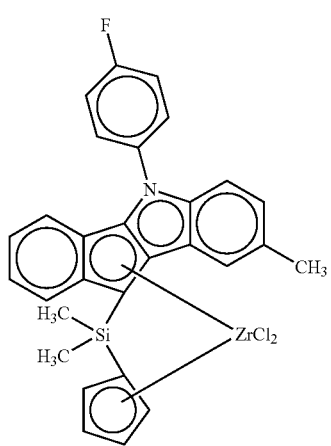
18
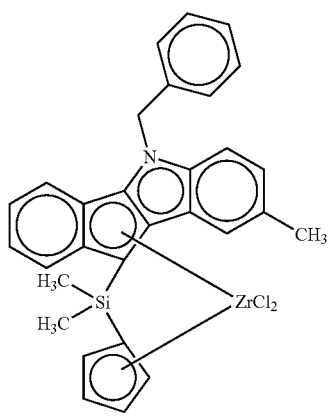
19
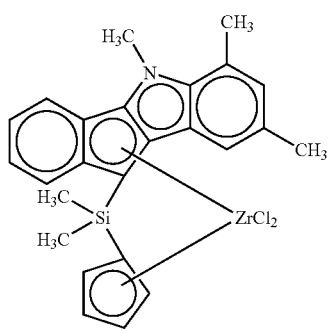
-continued
20
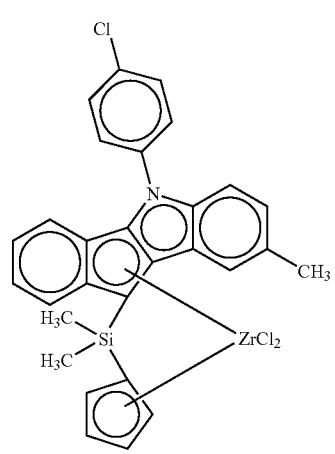
21
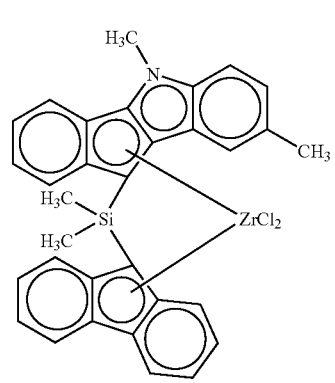
22
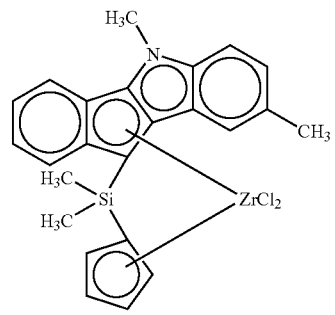
23

TABLE 1

Polymerizations

| Example | $M_w/M_n$ | VEF | $M_w$ | Activity Ratio | $M_w$ reduction with $H_2$ | density | Tertiary C/ 1000 C |
|---|---|---|---|---|---|---|---|
| 1 | 19.2 | 1.3 | 170,000 | — | — | 0.947 | 5.3 |
| 2 | 14.9 | 2.1 | 149,000 | 9.5 | 86% | 0.947 | 5.5 |
| C3 | 15.4 | 3.4 | 116,000 | 8.0 | 57% | 0.944 | 8.4 |
| C4 | 18.1 | 3.7 | 223,000 | 5.4 | 68% | — | — |
| C5 | 5.7 | 0.8 | 68,000 | 4.2 | 76% | 0.948 | 5.9 |
| C6 | 3.4 | 0.8 | 51,000 | 1.9 | 90% | — | 6.8 |
| C7 | 3.0 | 1.4 | 53,000 | 1.3 | 87% | 0.945 | 7.9 |
| C8 | 3.3 | 1.1 | 58,000 | 1.6 | 89% | 0.947 | 5.2 |
| C9 | — | — | — | 4.1 | — | 0.918 | 18.2 |
| C10 | 10.3 | 5.9 | 86,000 | 2.3 | 77% | 0.956 | 4.3 |
| C11 | 9.5 | 4.6 | 325,000 | 0.94 | 6% | 0.930 | 5.2 |
| C12 | 2.6 | 1.2 | 37,000 | 5.3 | 84% | 0.944 | 9.2 |
| C13 | 3.3 | 2.0 | 78,000 | 6.0 | 69% | 0.932 | 18.2 |
| C14 | 2.6 | 1.1 | 35,000 | 4.1 | 83% | 0.953 | 7.2 |
| C15 | 6.4 | 5.5 | 181,000 | 1.8 | 64% | 0.937 | 6.2 |
| C16 | 4.7 | 1.2 | 46,000 | 1.9 | 85% | 0.950 | 5.4 |
| C17 | 3.9 | 1.4 | 55,000 | 0.88 | 90% | — | 5.8 |
| C18 | 3.9 | 1.5 | 58,000 | 2.5 | 85% | 0.948 | 5.3 |
| C19 | 4.1 | 1.4 | 48,000 | 3.8 | 94% | 0.948 | 6.5 |
| C20 | 3.3 | 2.0 | 54,000 | 3.3 | 89% | — | 5.9 |
| C21 | 16.1 | 0.2 | 222,000 | 0.10 | 36% | 0.955 | 9.5 |
| C22 | 13.5 | 1.2 | 454,000 | 0.51 | 40% | 0.935 | 3.6 |
| C23 | 3.2 | 1.1 | 52,000 | 2.9 | 90% | 0.946 | 5.8 |

As shown in Table 1, the claimed process (Examples 1 and 2) produces polyethylene with a broad molecular weight distribution as indicated by a $M_w/M_n$ greater than 10. Examples 1 and 2 have low long chain branching as indicated by a viscosity enhancement factor of less than 2.5. Example 2 shows that the process has high activity as demonstrated by an activity ratio of greater than 4. The hydrogen sensitivity is good as demonstrated by a molecular weight reduction of greater than 60% with hydrogen. Comparative Examples 3-23 demonstrate that this balance of properties is unexpected. Most examples have a $M_w/M_n$ less than 10 and those that have a broad molecular weight distribution, generally have higher long-chain branching. The two exceptions (Comparative Examples 21 and 22) have poor catalyst activity and poor hydrogen sensitivity.

EXAMPLE 24

Film Production

A polyethylene resin prepared as described in Example 1 using a single reactor ($M_w/M_n$=19; VEF=1.3) is converted to a 0.5-mil blown film, generally as described in U.S. Pat. No. 5,962,598. The resin sample is processed on a Kiefel film extrusion line, which has a 60-mm extruder and a 120-mm die with a 1.2-mm die gap. Film is produced using a constant extruder speed of 65 rpm, a neck height of six die diameters, and a blow-up ratio of 4:1. Processing data: melt pressure: 6180 psi; output: 163 lb./h.; bubble stability index (see the '598 patent): 44. Film properties: MD tear strength: 15 g; TD tear strength: 33 g; TEDD impact: 1.0 ft-lb.

For comparative purposes, a commercial high-molecular-weight polyethylene film resin, Alathon® L5005 (product of Equistar Chemicals; density: 0.949 g/cm³; melt index: 0.057 dg/min), which is prepared by a two-reactor process, is converted to a film under the conditions described above. Processing data: melt pressure: 7480 psi; output: 163 lb./h; bubble stability index: 41. Film properties: MD tear: 12 g; TD tear: 38 g; TEDD impact: 1.5 ft-lb.

The results demonstrate that a polyethylene resin of the invention provides a good balance of processing (low pressure, good bubble stability) and physical properties (tear and impact) that are comparable to those obtained using a commercial two-reactor resin.

A single-reactor resin having a narrow molecular weight distribution was also evaluated, but the resin could not be processed to provide an acceptable blown film.

The preceding examples are meant only as illustrations. The following claims define the invention.

We claim:

1. A process for making polyethylene having a broad molecular weight distribution and low level of long-chain branching, said process comprising polymerizing ethylene in a single reactor in the presence of hydrogen, a $C_3$-$C_{10}$ α-olefin, and a catalyst comprising an activator and a supported, dialkylsilyl-bridged bis(indeno[1,2-b]indolyl)zirconium complex to produce polyethylene having an $M_w/M_n$ greater than 10 and a viscosity enhancement factor of less than 2.5.

2. A continuous slurry or gas-phase process of claim 1.

3. The process of claim 1 wherein the activator is selected from the group consisting of alumoxanes, alkylaluminum compounds, organoboranes, ionic borates, ionic aluminates, aluminoboronates, and combinations thereof.

4. The process of claim 1 wherein the complex has the structure:

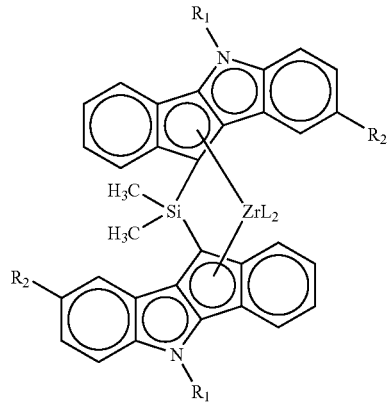

wherein each $R_1$ is independently selected from the group consisting of $C_1$-$C_{10}$ hydrocarbyl; each $R_2$ is independently selected from the group consisting of H, F, and $C_1$-$C_{10}$ hydrocarbyl; and each L is independently selected from the group consisting of halide, alkoxy, aryloxy, siloxy, alkylamino, and $C_1$-$C_{30}$ hydrocarbyl.

5. The process of claim 4 wherein $R_1$ and $R_2$ are methyl.

6. The process of claim 1 wherein the complex is a mixture of diastereomers.

7. The process of claim 6 wherein the diastereomers comprise racemic (rac) and meso stereoisomers, and the molar ratio of rac:meso stereoisomers is within the range of 0.1:1 to 1:0.1.

8. The process of claim 1 wherein the catalyst has an activity ratio as defined herein greater than 4.

9. The process of claim 8 wherein the introduction of 0.82 mmoles of hydrogen per mole of ethylene reduces the weight-average molecular weight by at least 60%.

10. The process of claim 1 wherein the polymerization is performed at a temperature within the range of about 40° C. to about 90° C.

* * * * *